United States Patent [19]

Lewison

[11] 4,353,849

[45] Oct. 12, 1982

[54] MANUFACTURE OF SOFT CONTACT LENSES HAVING VENT PASSAGEWAYS

[76] Inventor: Lawrence Lewison, c/o Contact Lens Specialists, 489 Fifth Ave., New York, N.Y. 10017

[21] Appl. No.: 275,373

[22] Filed: Jun. 19, 1981

[51] Int. Cl.³ .............................................. B29D 11/00
[52] U.S. Cl. .................................. 264/2.7; 351/160 H
[58] Field of Search .......................... 264/1.1, 2.6, 2.7; 351/160 H

[56] References Cited

U.S. PATENT DOCUMENTS

| | | | |
|---|---|---|---|
| 2,393,266 | 1/1946 | Riddell | 351/160 H |
| 2,989,894 | 6/1961 | Gordon | 351/160 H |
| 3,228,741 | 1/1966 | Becker | 351/160 H |
| 3,246,941 | 4/1966 | Moss | 351/160 H |
| 3,431,046 | 3/1969 | Conrad et al. | 351/160 R |
| 3,497,577 | 2/1970 | Wichterle | 264/2.6 |
| 4,053,442 | 10/1977 | Jungs et al. | 264/2.6 |

FOREIGN PATENT DOCUMENTS

| | | | |
|---|---|---|---|
| 809894 | 3/1959 | United Kingdom | 351/160 H |
| 2031178 | 4/1980 | United Kingdom | 351/160 H |

*Primary Examiner*—James B. Lowe
*Attorney, Agent, or Firm*—Bauer & Amer

[57] ABSTRACT

In connection with the heretofore commonly molded soft corneal contact lens, a substitute manufacturing method is used so as to embody the lens with air vent configurations which effectively resist flattening during use, the referred to substitute method including forming impressions in the lens construction material in the locations of the air vents which increases the density in the walls bounding the air vents so that these walls do not collapse, or flatten, during use.

3 Claims, 7 Drawing Figures

U.S. Patent     Oct. 12, 1982     4,353,849
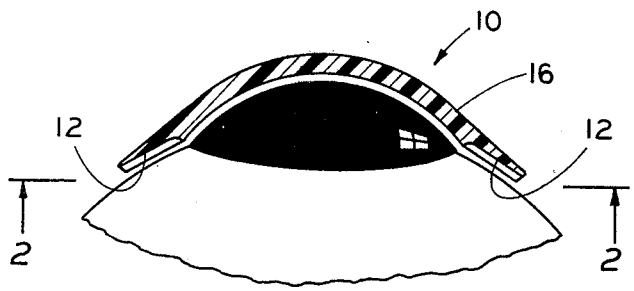
Fig. 1
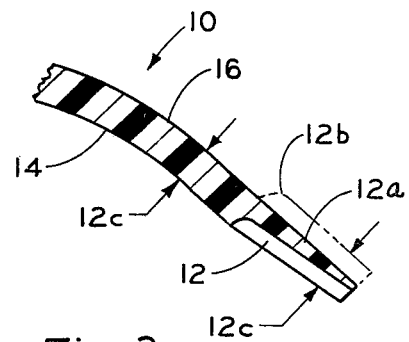
Fig. 3
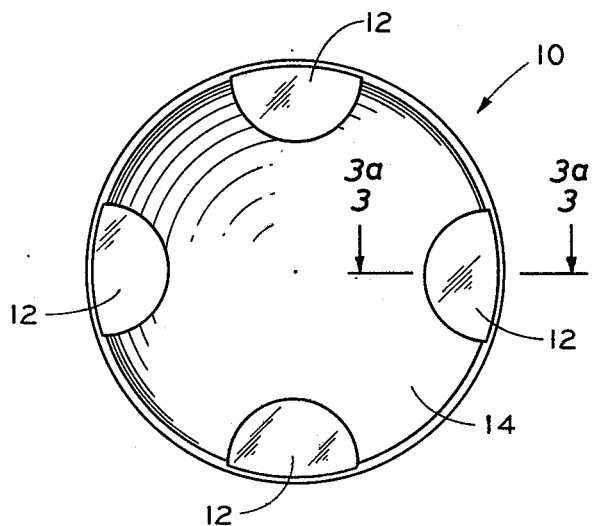
Fig. 2
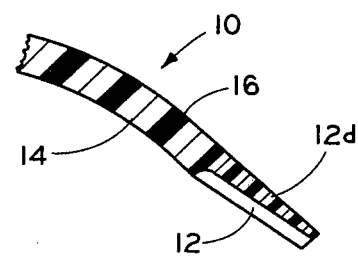
Fig. 3a
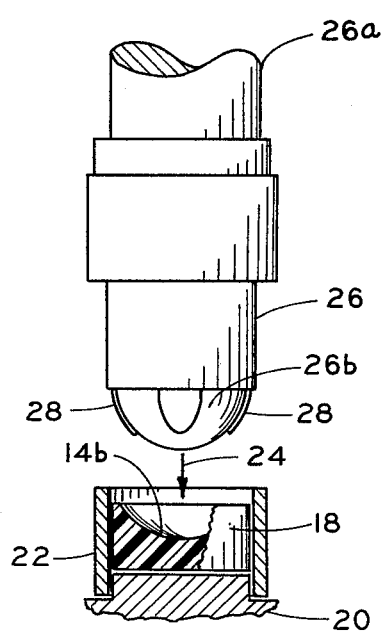
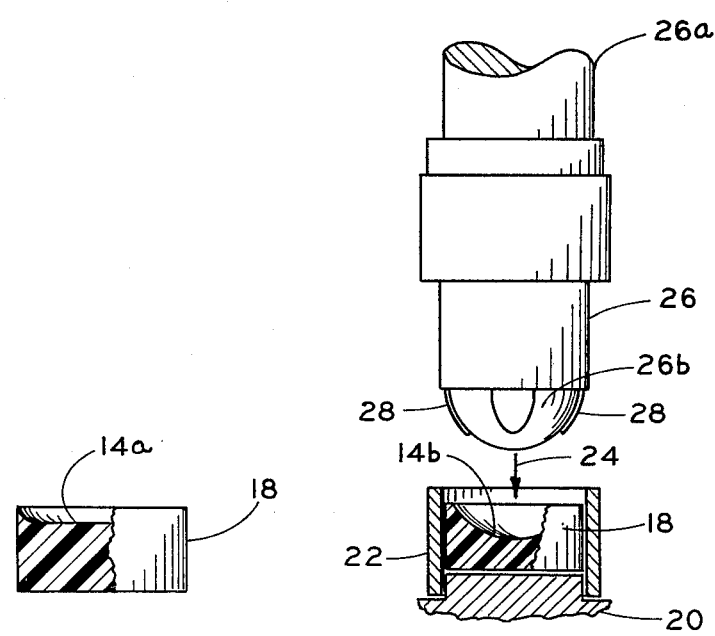
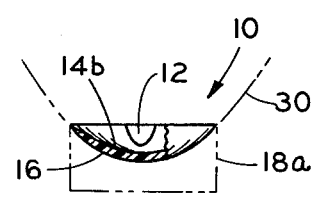
Fig. 4     Fig. 5     Fig. 6

MANUFACTURE OF SOFT CONTACT LENSES HAVING VENT PASSAGEWAYS

The present invention relates to a corneal contact lens of the type offering the advantages of peripherally located, circumferentially spaced vent openings, as exemplified by the lens of British Patent Specification No. 809,894 published Mar. 4, 1959 or the lens of U.S. Pat. No. 3,431,046, and more particularly to a method of manufacturing such lens of the so-called "soft" or hydrophilic category, as exemplified by the lens of U.S. Pat. No. 3,647,736.

While it is no problem to impart and maintain a domed wall structure of a vent opening in a "hard" construction material of a corneal contact lens, the hydrophilic or "soft" so-called, variety has not heretofore been satisfactorily made with the referred to vent opening feature. The molding of the lens, which is how it is commonly produced, does not produce enough strength in the wall bounding the vent opening so that after hydrophilic absorption of water it can effectively avoid collapse and flattening.

Broadly, it is an object of the present invention to produce, in a sustaining form, vent openings in a soft corneal contact lens, to thereby overcome the foregoing and other shortcomings of the present invention. Specifically, it is an object to provide vent openings in said lens bounded by walls of enhanced strength, so that even in the hydrophilic or softened condition of the lens the vents remain open for the effective passage therethrough of tears, oxygen and the like.

In connection with a "vented" soft corneal contact lens, a method of fabrication thereof demonstrating objects and advantages of the present invention includes providing the plastic construction material of the lens in an initial work-in-process cylindrical form and machining the upper portion of said form into a concave shape to embody the lens with an appropriate internal optical lens surface for proper fit on the patient's eye. Next in the manufacturing procedure is the step of providing the vent passageways in peripheral locations about said internal optical lens surface by forming impressions into this surface. Tests indicate that the impressions not only shape but also increase the density of the construction material in the walls bounding the impressions. Thus, after machining the lower portion of the form into a convex shape to embody the lens with an appropriate external optical lens surface and also after hydrophilic absorption by the lens of water necessary for its conversion into a softened condition, it has been found that the high-density construction material bounding the vent passageways is strong enough to resist flattening, and that the vent passageways provide the functioning intended.

The above brief description, as well as further objects, features and advantages of the present invention, will be more fully appreciated by reference to the following detailed description of the within inventive method in conjunction with a presently preferred, but nevertheless illustrative embodiment of a soft corneal contact lens made in accordance with said method.

In the drawings:

FIG. 1 is a side elevational view of a soft corneal contact lens in its typical position during use;

FIG. 2 is a bottom elevational view of the contact lens as seen in the direction of the arrows 2—2 of FIG. 1, illustrating structural details thereof;

FIGS. 3 and 3a are partial side elevational views, in cross-section taken respectively on lines 3—3 and 3a—3a of FIG. 2, illustrating differences in density of construction material in the portions of the lens bounding vent openings, so-called, of the lens;

Remaining FIGS. 4, 5 and 6 illustrate steps according to the method of the present invention of fabricating the soft corneal contact lens with said vent openings. More particularly, FIG. 4 is a partial side elevational view in cross-section illustrating the material for the lens in an initial work-in-process cylindrical form;

FIG. 5 is similarly a side elevational view in partial cross-section of said cylindrical form of FIG. 4 after additional processing thereof, and further illustrating how the vent openings are imparted thereto; and FIG. 6 is a partial side elevational view of the completed contact lens, from which the concluding steps of the lens-manufacturing method can be readily understood.

In FIGS. 1 and 2, reference numeral 10 generally designates a corneal contact lens. Prior to approximately 1965 the construction material of lens 10 was typically a rigid plastic material, in most instances methyl-methacrylate. After 1965, however, it was possible to fabricate product 10 from a hydrophilic material thereby resulting in a so-called soft corneal contact lens. One such suitable hydrophilic material is that described in U.S. Pat. No. 3,647,736 and consists of a hydrogel of a hydrophilic polymer formed from a major proportion of a hydroxyalkyl methacrylate and a minor portion of a polyalkene lactam.

Continuing with background discussion, when lens 10 was fabricated of hard construction material there was no particular obstacle to provide vent openings, individually and collectively designated 12, in peripheral locations circumferentially spaced about the interior lens surface 14. A description in the patent literature of the vent openings 12 may be found in British Patent Specification No. 809,894 published Mar. 4, 1959 and, in U.S. patent literature in U.S. Pat. No. 3,431,046.

For the sake of completeness in describing the background of the within invention, it is noted that for most plastic contact lenses, additional curves are added near the edge of the inner surface and the lens is fitted loosely over the eye in order to avoid irritation to the cornea with resulting discomfort to the patient. As an alternative to this technique, the vent passageways 12 are provided in the lens 10 in the circumferential locations as illustrated. Each vent passageway 12, in a preferred embodiment, is hemispherical in shape and approximately 3 millimeters in diameter. Moreover, each passageway 12 produces a domed effect along the inner surface 14 of the lens, thereby providing a channel for the free flow of tears and oxygen with the result to the patient of allowing the lens to be fitted more securely while at the same time permitting greater conformity, reducing irritation to the cornea, and providing greater adherence between the lens and cornea.

Lens 10 with vent passageways 12 fabricated of hard construction material is relatively easy to produce, using conventional molding techniques as explained, for example, in U.S. Pat. No. 3,497,577.

The same molding techniques are also utilized for the production of corneal contact lenses 10 of the soft variety, but heretofore the production of such lenses by molding has not been capable of providing a soft corneal contact lens 10 with vent passageways 12. More particularly, the wall structures bounding the vents have been unable, because of the soft condition of the construction material due to hydrophilic absorption of water, to retain their dome shape and function as passageways for the free flow of tears and oxygen as above explained. Instead, during use the pressure of the patient's eyelid during blinking that is exerted upon the external lens surface 16 invariably results in a collapse or flattening of the wall structure bounding the vent passageway 12.

The within inventive method in contrast to the prior art molding techniques used in the production of corneal contact lenses, whether of the hard or soft variety, enables the production of soft corneal contact lenses with vent passageways as exemplified by lens 10 embodied with the structural features 12. Before describing the method, it is helpful to understand how such method produces the objective desired. In this connection, comparison should be made of FIGS. 3 and 3a, the former FIG. 3 being intended to illustrate the production of a vent passageway 12 by molding wherein wall 12a bounding the passageway 12 is of a progressively diminished dimension. In the actual molding, however, a wall portion 12b might typically also be part of the wall 12a so that the overal dimension of the wall in cross-section, designated 12c, is approximately of the same extent as in other portions of the lens. As understood, this prevents collapse of the wall portion bounding each vent opening 12 until there is complete curing of the plastic construction material of the lens. Once curing is completed, however, it is of course necessary to remove the excess material 12b from the lens external surface 16. In the soft variety of the lens 10, the remaining wall 12a does not effectively resist flattening forces and thus it is usually not advisable to provide a soft corneal contact lens 10 with vent passageways 12.

FIG. 3a, which is to be contrasted with FIG. 3, exemplifies an entirely significantly different situation in which the lens wall 12d which bounds each vent opening 12 is readily capable of resisting flattening and thus in maintaining the dome shape which constitutes each vent opening 12. As best can be illustrated by a drawing, the ability of wall 12d to provide the result noted resides in an increased density in the construction material from which wall 12d is fabricated. That is, while wall 12d has approximately all of the physical attributes, in terms of size and shape, as wall 12a, there is a greater amount of material, and thus a greater density, in the wall 12d, which thus enables wall 12d to effectively resist flattening forces. Stated more simply, wall 12d because of its greater density is stronger than wall 12a.

Departing from the molding techniques of the prior art, it is proposed in accordance with the present invention to fabricate what ultimately is a soft corneal contact lens using the method steps now to be described and depicted in FIGS. 4-6. An appropriate hydrophilic contact lens material is provided in an initial form of a cylindrical member 18, as illustrated in FIG. 4. What is destined to be the inner lens surface, previously noted by the reference numeral 14, is appropriately machined to a concave shape having dimensions that will permit the fitting of the lens to the cornea of the patient's eye. Thus, the inner lens surface may start out with the shape designated 14a in FIG. 4 and ultimately have the shape 14b as illustrated in FIG. 5.

As illustrated in FIG. 5, the member 18 with an appropriately machined inner lens surface 14b is placed on a mandrel 20 within the confines of a retaining ring 22 in the path of movement 24 of a die member 26. At its upper end, as at 26a, it will be understood that there is an appropriate connection to a source of hydralic pressure which is effective in urging the die member 26 through a power stroke along the path 24 under variable pressure, in this instance being preferably in the range of 60 to 90 pounds per square inch. Cylindrical form 18 before being placed within the ring 22 will be understood to be heated to a temperature in the range of between 250 to 400 degrees Fahrenheit. The die member 26, and more particularly the die surface 26b having machined raised surfaces 28 thereon, is pressed under pressure against the lens inner surface 14b. The raised die surfaces 28 are in the peripheral and circumferentially spaced locations of the vent passageways 12 and thus result in creating impressions in the lens surface 14b which provide each of the vent passageways 12, all as illustrated in FIG. 6. Cylindrical form 18 is then removed from the ring 22 and, again as illustrated in FIG. 6, the excess material designated 18a is appropriately removed by machining. More particularly, the machining is conducted along the reference line 30 in a well understood manner to provide an appropriately shaped outer or external lens surface 16 that is mathematically calculated from computerized charts, based on the patient's prescription, to achieve the desired degree of optical correction.

For completeness' sake it is to be noted that the lens 10 in the condition depicted in FIG. 6 is then allowed to soak in a saline solution, and will typically uniformly absorb from one-third to one-half its weight, in water, and will therefore assume a desired softened condition characteristic of a soft corneal contact lens.

From the foregoing it should be readily appreciated that there has been described herein an effective method of embodying a soft contact corneal lens with vent passageways 12 that are capable of effectively resisting flattening forces when in use because of the increased density and greater strength in the wall 12d (FIG. 3a) which bounds each vent passageway 12.

A latitude of modification, change and substituion is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A method of making a soft corneal contact lens with vent passageways about the periphery thereof comprising the steps of providing the plastic construction material for fabricating a soft corneal contact lens in an initial work-in-process cylindrical form, machining the upper portion of said form into a concave shape to embody said lens with an internal optical lens surface, providing the vent passageways in peripheral locations about said internal optical lens surface by forming impressions into said surface and correspondingly increasing the density of said construction material bounding said impressions, and machining the lower portion of said form into a convex shape to embody said lens with an external optical lens surface preparatory to subsequent hydrophilic absorption of the water for conversion of said lens into a softened condition, whereby said high-density construction material bounding said vent passageways resists flattening even in said softened condition of said lens.

2. The method of making a soft corneal contact lens with vent passageways as defined in claim 1 wherein said impressions forming said vent passageways are produced by a member urged into contact with said internal optical lens surface under pressure in a range of 60 to 90 pounds per square inch and at a temperature in the range of 250 to 400 degrees Fahrenheit.

3. The method of making a soft corneal contact lens with vent passageways as defined in claim 2 wherein a ring is disposed in encircling relation about said work-in-process cylindrical form during the formation of said impressions to minimize lateral deformation and to optimize the increasing of the density of said construction material of said form that bounds said impressions.

* * * * *